United States Patent [19]

Deane

[11] Patent Number: 4,651,580

[45] Date of Patent: Mar. 24, 1987

[54] ACTUATORS

[75] Inventor: Norman P. Deane, Rugby, England

[73] Assignee: AE PLC, Warwickshire, England

[21] Appl. No.: 759,318

[22] Filed: Jul. 26, 1985

[30] Foreign Application Priority Data

Jul. 27, 1984 [GB] United Kingdom ............... 8419238

[51] Int. Cl.⁴ ...................... F16H 19/02; F16H 1/46
[52] U.S. Cl. ........................................ 74/89.2; 74/785
[58] Field of Search ............... 74/89.2, 768, 785, 788

[56] References Cited

U.S. PATENT DOCUMENTS

| | | | |
|---|---|---|---|
| 2,195,400 | 4/1940 | Arens | 74/89.2 |
| 2,366,739 | 1/1945 | McCoy | |
| 2,482,568 | 9/1949 | Werner | |
| 2,564,271 | 8/1951 | Millns | 74/785 |
| 2,682,789 | 7/1954 | Ochtman | 74/768 |
| 3,115,204 | 12/1963 | Dence | 74/785 |
| 3,190,414 | 6/1965 | Maurer et al. | 74/785 |
| 3,550,469 | 12/1970 | Morse | |
| 3,762,523 | 10/1973 | Thorsby | 192/139 |
| 3,872,742 | 3/1975 | States | 74/785 |
| 4,347,762 | 9/1982 | Holdeman | 74/788 |

FOREIGN PATENT DOCUMENTS

| | | |
|---|---|---|
| 0030022 | 6/1981 | European Pat. Off. . |
| 0110421 | 6/1984 | European Pat. Off. . |
| 855785 | 7/1949 | Fed. Rep. of Germany . |
| 7821020 | 12/1979 | Fed. Rep. of Germany . |
| 3145217 | 5/1983 | Fed. Rep. of Germany . |
| 590050 | 6/1925 | France . |
| 59-89855 | 5/1984 | Japan ............... 74/785 |
| 685972 | 1/1951 | United Kingdom . |
| 1058593 | 5/1964 | United Kingdom . |
| 1039195 | 8/1964 | United Kingdom . |
| 1207754 | 5/1968 | United Kingdom . |
| 1265510 | 12/1969 | United Kingdom . |
| 1531355 | 7/1976 | United Kingdom . |
| 1532044 | 8/1976 | United Kingdom . |
| 2141203A | 12/1984 | United Kingdom . |
| 2157387A | 10/1985 | United Kingdom . |

Primary Examiner—Lawrence Staab
Attorney, Agent, or Firm—Leydig, Voit & Mayer

[57] ABSTRACT

An electric motor driven actuator comprises an electric motor whose rotation causes rotation of a planet carrier carrying planet gears which engage an annulus gear on the inside of a stationary ring. A pinion transmits rotation of the planet carrier to further planet gears which are carried on another planet carrier and engage another annulus inside an axially movable ring. This ring can be moved axially by an armature in dependence on energization of an electro magnetic coil within a housing. When the ring moves towards the first-mentioned, stationary, ring, face teeth which it carries engage face teeth on the latter ring, and the axially movable ring is thus held stationary. Its planet carrier thus rotates and a coupling rotates a shaft which, via a tape, transmits drive to an output cable. When the coil is de-energized rings, separate again and the axially movable ring is no longer held stationary and its planet carrier no longer rotates.

12 Claims, 4 Drawing Figures

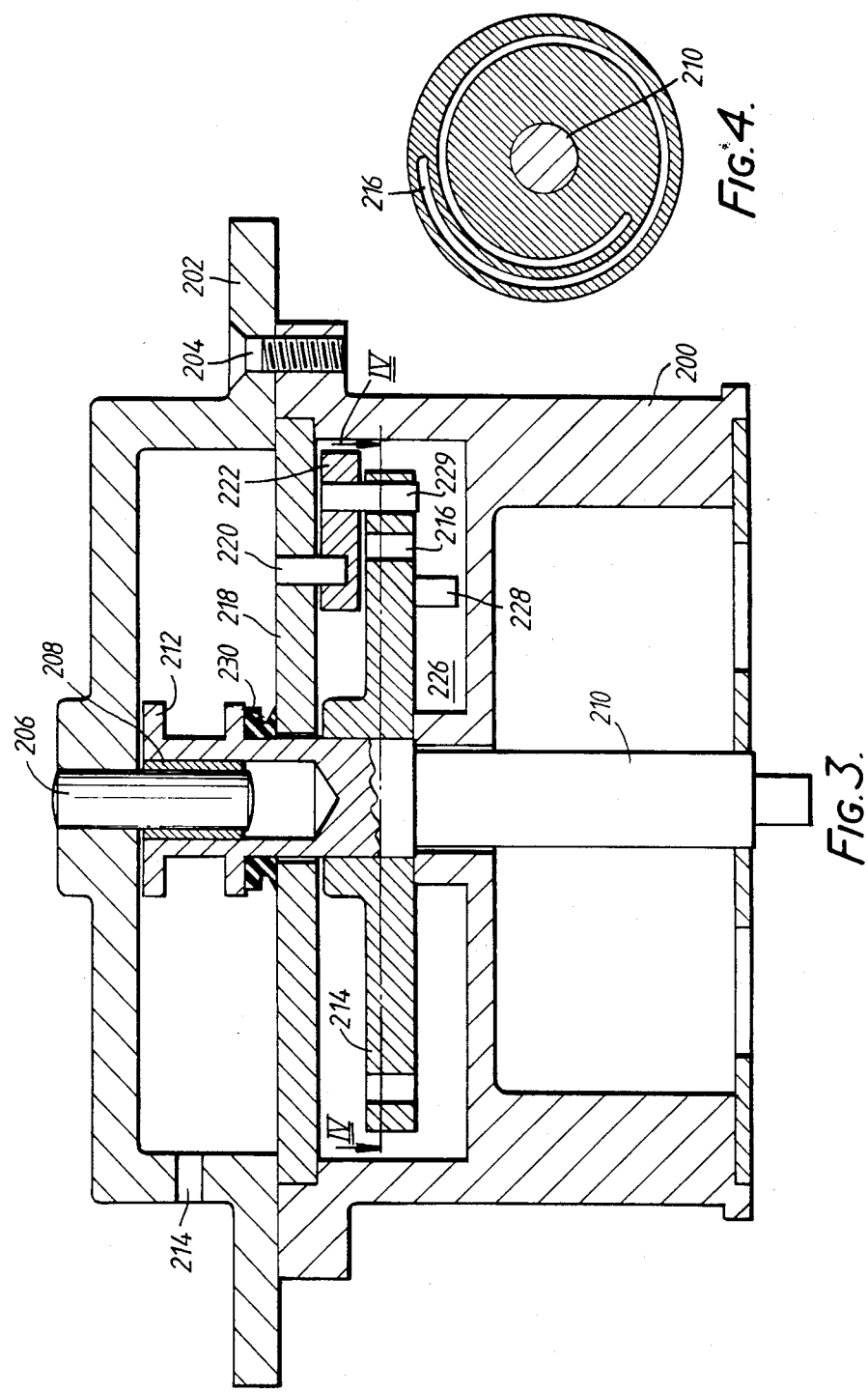

ACTUATORS

BACKGROUND OF THE INVENTION

The invention relates to actuators. Actuators embodying the invention and to be described in more detail below incorporate an electric motor which is arranged to produce translational movement of an output member. The actuators to be described may be used as part of an automatic vehicle speed control system for controlling a vehicle to run at a desired speed. In such systems, a control signal is developed depending on any error between actual and desired speeds for the vehicle, and this control signal energises the actuator whose output member adjusts the engine power (such as by adjusting the engine throttle in the case of an internal combustion engine) so as to bring the vehicle to the desired speed. However, the actuators to the described are not limited to such use.

SUMMARY OF THE INVENTION

According to the invention, there is provided an actuator, comprising a motor having a rotatable output shaft, an output member mounted for translational movement, and epicyclic gearing for providing geared reduction of the rotation of the motor shaft and connecting it to the output member to cause translational movement thereof, the epicyclic gearing being arranged axially of the motor shaft.

According to the invention, there is also provided an electric motor-driven actuator, comprising: an electric motor; a first epicyclic gear unit having a stationary annulus gear mounted coaxially of the motor shaft, and a planet cluster comprising a plurality of planet gears rotatably supported on a planet carrier and internally meshing with the annulus gear and connected to be rotated by the motor shaft so as to cause the planet carrier to rotate; a second epicyclic gear unit comprising a second annulus gear mounted coaxially of the motor shaft, and a second planet cluster comprising a plurality of planet gears rotatably supported on a planet carrier and internally meshing with the second annulus and connected to be rotated by rotation of the planet carrier of the first epicyclic unit, clutch means for releasably braking the annulus of the second epicyclic unit so that, when the second annulus is braked, rotation of the motor shaft causes rotation of the second planet carrier and, when the second annulus is not braked, rotation of the motor shaft results in rotation of the annulus of the second unit but not in rotation of the planet carrier thereof; and a coupling connecting the planet carrier of the second epicyclic unit to cause translational movement of an actuator output member of the actuator.

DESCRIPTION OF THE DRAWINGS

An electric motor-driven actuator embodying the invention will now be described, by way of example only, with reference to the accompanying diagrammatic drawings in which:

FIG. 3 is a section showing another modified form of the same part of the actuator; and FIG. 4 is a section on the line IV—IV of FIG. 3.

DESCRIPTION OF PREFERRED EMBODIMENTS

Figure 1:
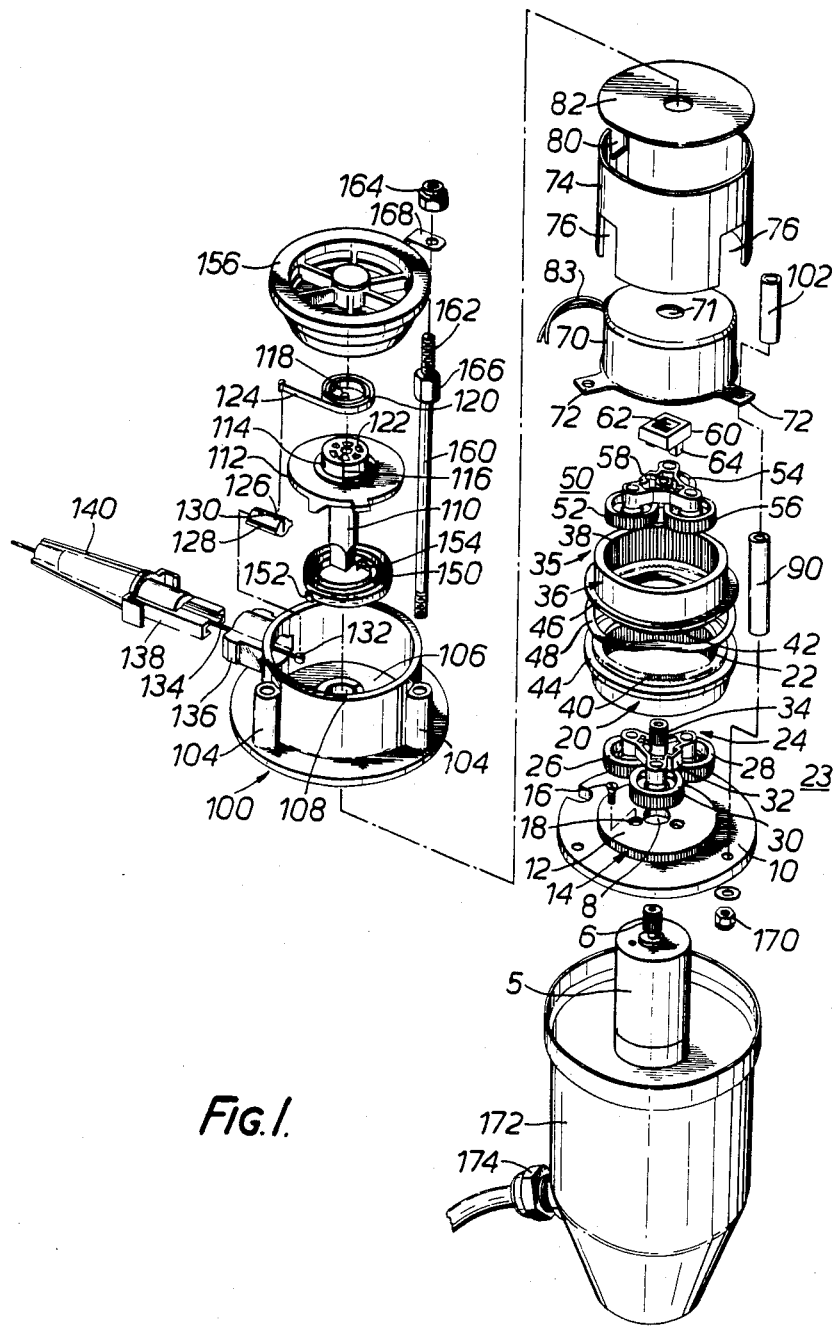
FIG. 1 is an exploded view of the actuator.

The actuator has an electric motor 5 having an output shaft on which is carried in a pinion 6. This pinion passes through a hole 8 in a base plate 10. Rigid with the base plate 10 is a gear 12 carrying gearing 14. The base plate 10 is rigidly fixed to the housing of the motor 5 by means of screws 16 (only one shown) which pass through holes 18.

A ring 20 carrying an annulus gear 22 forms part of a first epicyclic gear unit 23. Ring 20 sits on the base plate 10 so that its annulus gear engages the gearing 14 which thus holds the ring 20 stationary. The epicyclic unit 23 is completed by a planet cluster 24 comprising planet gears 26,28 and 30 which are driven by the pinion 6, mesh internally with the annulus 22, and are freely rotatably supported on a planet carrier 32 which is rigid with a pinion 34.

A second epicyclic unit 35 comprises a ring 36 carrying an annulus gear 38. The ring 36 is similar in configuration to the ring 20 but is mounted in the actuator in inverted form as compared with the ring 20. The facing ends of the rings 20 and 36 carry respective arrays of teeth 40 and 42 which face each other axially of the actuator. Each ring 20, 36 has a respective flange 44,46 between which is mounted a circular spring 36 in the form of an undulating washer. This spring biases the ring 36 away from the ring 20 so as to move its face teeth 42 out of engagement with the teeth 40 on the ring 20. In a manner to be described, however, the ring 36 can be moved axially, against the action of the spring 48, so as to bring the teeth 40 and 42 into engagement. It will be apparent that this locks the rings together so as to prevent rotation of ring 36.

The second epicyclic unit 35 is completed by a planet cluster 50 in the form of three planet gears 52,54 and 56 which are freely rotatably supported on a planet carrier 58 and engage the annulus gear 38 and are themselves engaged by the pinion 34. The planet carrier 58 carries a coupling 60 having a square hole 62 and lugs 64 which fit into recesses in the planet carrier 58.

The actuator also incorporates an electromagnetic coil mounted within a coil housing 70 which has a through hole 71 and three arms 72 (only two visible).

A clutch thrust member 74 is slidably mounted around the outside of the housing 70 with its lower peripheral end sitting on the flange 46 of the ring 36. Slots 76 provide clearance for the arms 72. A disc 82 of magnetic material, having a through hole, rests on the uppermost periphery of the clutch thrust member 74. A slot 80 provides clearance for the electrical leads 82 connected to the coil in the housing 70.

When the actuator is assembled, the coil housing 70 is held at a fixed distance from the base plate 10 by three hollow cylindrical spacers 90 (only one shown) which are respectively mounted in alignment with the three arms 72 of the housing 70 and with holes 92 in the plate 10.

A take-off housing 100 is mounted on top of the magnetic disc 82 and held in a fixed axial position by means of three hollow cylindrical spacers 102 (only one shown) each of which is positioned in alignment with a respective one of the arms 72 on the housing 70 and with a respective integral bore 104 of the housing 100. The housing has a base 106 with a through hole 108, through which extends a shaft 110 having a squared end which engages the square hole 62 in the coupling 60.

The upper end of the shaft 110 is integral with a disc 112 which carries an integral boss 114. The boss 114 has a slit 116 by means of which the enlarged head 118 at the end of a spiral tape 120 may be located in a correspondingly shaped recess 122, with the tape thus encircling the boss 114. The other end of the tape 120 is in the form of a tangentially extending arm 124 having an enlarged head which locates in a keyway 126 in a cable end 128. The cable end 128 has another keyway 130 for receiving the head 132 of a cable 134. The cable extends outwardly through a boss 136 and a support 138 for an outer casing 140. A spiral spring 150 has ends 152 and 154 which respectively engage locating points on the inside of the housing 100 and the underside of the ring 112.

The actuator has an end ring 156 which sits within the open end of the housing 100 and locates the disc 112.

The assembly is held together by means of three studs 160 (only one shown), each of which has a screw-threaded upper end 162 receiving nuts 164 and 166 which hold a clip 168 in position, the three clips gripping the end ring 156. Each stud 160 passes through a respective one of the bosses 104, the spacers 102, the arms 72, the spacers 90 and the holes 92, and is held securely in position by means of a respective nut 170.

A cover 172 encloses the working parts of the actuator and has a cable entry 174 for the electrical leads to the motor 5. It may for example be swaged in position.

In operation, the rings 20 and 36 and the coil within the housing 70 act as an electromagnetic clutch. When the coil is electrically energised, the resultant magnetic force causes the magnetic disc 82 to be drawn axially towards the coil housing (downwardly as viewed in FIG. 1) and pushes the clutch thrust member 74 downwardly (this movement being permitted by the slits 76). The member 74, in moving downwardly, presses on the flange 46 and drives the ring 36 downwardly so that its teeth 42 engage the teeth 40 on the ring 20. This movement takes place against the bias of the spring 48. Engagement of the clutch in this way thus causes the ring 36 to be held stationary, because the ring 20 is itself held stationary by engagement of the annulus gearing 22 with the gearing 14.

Energisation of the motor 5, and the consequent rotation of the pinion 6, will thus rotate the planet gears 26,28 and 30. Since the annulus 22 is held stationary, the planet carrier 32 will itself rotate, but at a reduced speed compared with that of the pinion 6. This rotation of the planet carrier 32 will rotate the pinion 34 correspondingly which drives the planet gears 52,54 and 56. Because the ring 36 is held stationary by the engaged clutch, the planet carrier 58 will thus rotate, but at a further reduced speed. This rotation will be transmitted by the drive coupling 60 to the shaft 110. The resultant rotation of the ring 112 and the boss 114 will be transmitted to the cable 134, either pulling or pushing on the cable according to the direction of rotation of the motor 5.

The spring 150 may be arranged to exert its spring bias in either direction, as desired: that is, it may be arranged to exert a bias which gives a slight pulling force on the cable 134 or a slight pushing force.

When the clutch is disengaged, by de-energising the coil within the coil housing 70, the magnetic force acting on the disc 82 is removed and the ring 36 moves axially away from the ring 20 under the action of the spring 48. Ring 36 is thus freely rotatable. The result of this is that the rotating planet gears 52,54 and 56 now cause the ring 36 to rotate and transmit no rotation to the planet carrier 58.

The use of epicyclic gearing provides a simple and compact way of producing a very substantial reduction in rotational speed (or angular distance covered) between the output shaft of the motor and the shaft 110. It also enables the actuator to be constructed with substantially all its parts arranged symmetrically around its axis. The epicyclic units 23 and 35 can be substantially identical, thus simplifying manufacture and production.

Advantageously, a substantial part of the actuator is made of suitable plastics material. For example, the base plate 10 and the epicyclic units may all be made of plastics material as may the coil housing 70, the clutch thrust member 74, the housing 100 and the cover 172.

When used in a vehicle speed control system, the actuator may be used to position the throttle of the engine carburettor—to which it would be connected by the cable 134. The clutch permits substantially instantaneous release of the drive to the output shaft 110, allowing the throttle to close under the action of the spring 150 and of any other spring which may be connected to the throttle mechanism.

Figure 2:
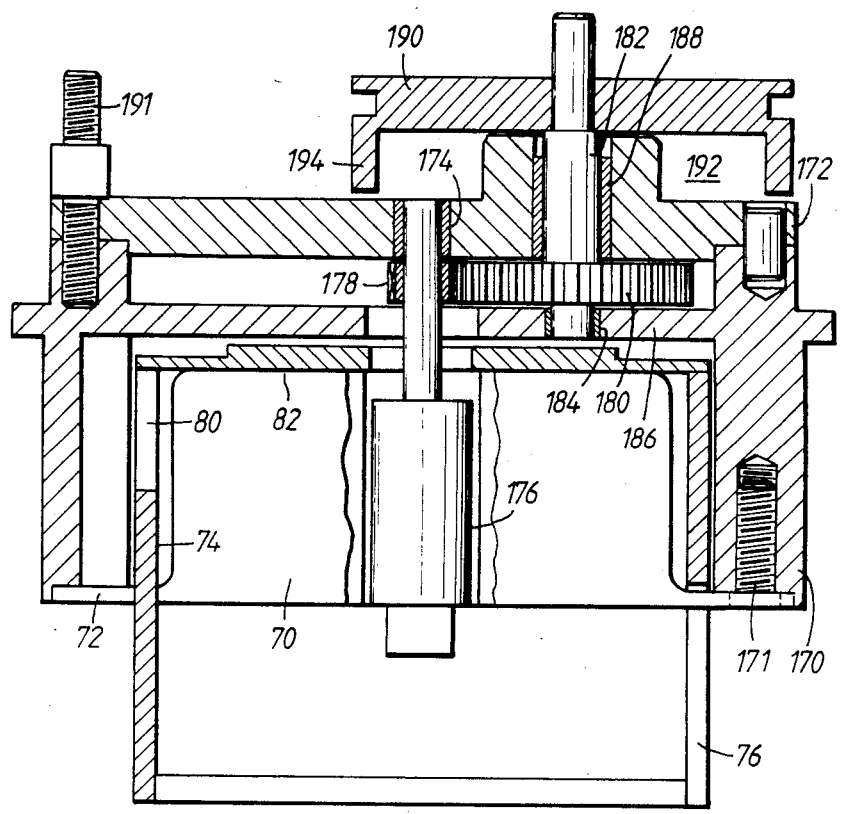
FIG. 2 is a section showing a modified form of part of the actuator of FIG. 1.

FIGS. 2, 3 and 4 show modified forms which the output end of the actuator can have, that is, the part of the actuator which converts the rotary movement into the translational pull on the cable 134. In certain applications, the arrangement shown in FIG. 1 may generate insufficient pull on the cable to overcome the drag in its casing and the bias of the return spring 150. Limitations of space may prevent the increased pull being obtained by altering the effective gear ratios of the epicyclic gearing and/or by increasing the output power of the motor. The latter step could cause undue heating which might be difficult to dissipate.

The modification shown in FIG. 2 replaces the take-off housing 100 of FIG. 1 and its component parts. In FIG. 2, parts corresponding to parts in FIG. 1 are correspondingly referenced.

As shown in FIG. 2, a housing 170 is arranged to be bolted on instead of the housing 100 by studs similar to the studs 160 of FIG. 1 which enter threaded bores 171. Inside the housing 170 are shown the housing 70, the clutch thrust member 74 and the disc 82 of FIG. 1.

The housing 170 has a cover 172 which is bored to hold a bearing 174 in which runs the upper end of a shaft 176 corresponding to the shaft 110 of FIG. 1. This shaft has a squared end which locates in the square hole 62 in the coupling 60 of FIG. 1. The shaft carries a pinion 178 which is rigid with it and is in meshing engagement with a pinion 180 carried on a shaft 182. Shaft 182 is supported at one end by a bearing 184 running in a wall 186 across the housing 170 and is supported at the other end by a bearing 188 in the top 172. The shaft 182 is rigid with a boss 190 corresponding to the boss 114 of FIG. 1. The boss 190 carries the spiral tape 120 (of FIG. 1) which, in similar fashion to that shown in FIG. 1, would be connected to the cable end 128 of the cable 134, one end of this tape being fixed to the periphery of the boss 190. The cable and its casing are not shown in FIG. 2 but the casing would be attached to a bracket 191.

A return spring corresponding to the return spring 150 of FIG. 1 is located in the space 192 shown in FIG. 2 and acts on a lug 194 on the boss 190.

In operation, therefore, rotation of the shaft 176 rotates the boss 190 through the intermediary of the meshing pinions 178 and 180 and the shaft 182 and thus causes translational movement of the cable 134. The meshing pinion 178 and 180 provide increased mechanical advantage.

In the arrangement shown in FIGS. 3 and 4, the housing 100 of FIG. 1 is replaced by a housing 200 which is secured in position to the remainder of the actuator by studs corresponding to the studs 160 of FIG. 1, these studs passing through bores or the like corresponding to the bores 104 of FIG. 1 but which are not visible in FIG. 3. The housing 200 has a cover 202 which is held in position by countersunk screws 204. The cover 202 carries a stud 206 supporting a bearing 208 in the hollow end of a shaft 210. Shaft 210 corresponds to the shaft 110 of FIG. 1 and has a squared end which locates in the square hole 62 in the coupling 60 of FIG. 1. The shaft 210 is rigid with a boss 212. This boss corresponds to the boss 114 of FIG. 1 and can carry a spiral tape corresponding to the tape 120, one end of this tape being locked to the periphery of the boss 212 and its other end being connected to the cable 134 in the same manner as in FIG. 1, the cable passing out through an exit hole 214.

It will be observed that this construction enables the diameter of the boss 212 to be significantly less than that of the boss 114 in FIG. 1, thus achieving the desired increased mechanical advantage.

In fact, because of the smaller diameter of the boss 212, the use of a tape corresponding to the tape 120 may not be entirely satisfactory because of its inability to bend sufficiently. Instead, therefore, a small ball chain may be wound round the boss 212 with one of its ends locked to the periphery of the boss and the other fixed to the cable end.

Because the boss 212 is of smaller diameter than the boss 114 of FIG. 1, a single revolution of the shaft 210 may not produce sufficient linear movement of the cable and it may therefore be necessary to permit the shaft 210 to make more than one revolution. In order to provide a stop defining the total angular movement permitted to the shaft, a disc 214 is rigidly mounted on the shaft 210 and is provided with a spiral groove 216 as most clearly shown in FIG. 4. A plate 218 is rigidly fixed in the housing and supports a pin 220 on which is mounted a swingable link 222. The latter carries a pin 224 which engages the groove 216. The total permitted angular movement of the shaft 210 is therefore controlled by the length of the spiral groove 216.

A return spring corresponding to the spring 150 of FIG. 1 is not shown in FIG. 3 but may be located within the space 226 so as to act on a lug 228 on the disc 214.

A seal 230 is provided to prevent ingress of dirt etc.

The arrangement shown in FIGS. 3 and 4 is simpler than that shown in FIG. 2 and should be less expensive because it involves no additional gearing and fewer bearings.

What is claimed is:

1. An actuator, comprising
  a motor having a rotatable output shaft,
  an output member mounted for translational movement, epicyclic gearing for providing geared reduction of the rotation of the motor shaft and connecting it to the output member to cause translational movement thereof, the epicyclic gearing being arranged axially of the motor shaft and comprising two epicyclic gear units,
  one said epicyclic gear unit being in the form of a plurality of planet gears supported on a planet carrier and engaging an annulus gear, the planet gears when rotated being arranged to cause rotation of the planet carrier when the said annulus is held stationary,
  the other said epicyclic gear unit being arranged coaxially with the said one epicyclic gear unit and being in the form of a further plurality of planet gears supported on a further planet carrier and engaging a further annulus gear, the planet gears of the said other epicyclic unit being connected to be rotated by the motor output shaft and the planet carrier thereof being connected to rotate the planet gears of the said one epicyclic unit, the annulus of the said other epicyclic unit being held permanently stationary, and
  a clutch for interrupting the drive between the motor output shaft and the output member, the clutch comprising means for releasably braking the annulus of the said one epicyclic gear unit,
  the said annuli carrying respective arrays of teeth which face each other axially, and the said means for releasably braking the annulus of the said one epicyclic gear unit comprising means for moving the annulus of the said one epicyclic gear unit axially so as to bring its teeth into and out of engagement with the teeth on the annulus of the said other unit.

2. An actuator according to claim 1, in which the clutch includes an electromagnetically energisable coil and an armature which moves in response to energisation of the coil and causes axial movement of the annulus of the said one epicyclic unit.

3. An actuator according to claim 1, in which the motor is an electric motor.

4. An actuator according to claim 1, in which the actuator output member is a cable.

5. An electric motor-driven actuator, comprising:
  an electric motor;
  a first epicyclic gear unit having a stationary annulus gear mounted coaxially of the motor shaft, and a planet cluster comprising a plurality of planet gears rotatably supported on a planet carrier and internally meshing with the annulus gear and connected to be rotated by the motor shaft so as to cause the planet carrier to rotate;
  a second epicyclic gear unit comprising a second annulus gear mounted coaxially of the motor shaft and a second planet cluster comprising a plurality of planet gears rotatably supported on a planet carrier and internally meshing with the second annulus and connected to be rotated by rotation of the planet carrier of the first epicyclic unit;
  clutch means for releasably braking the annulus of the second epicyclic unit so that, when the second annulus is braked, rotation of the motor shaft causes rotation of the second planet carrier and, when the second annulus is not braked, rotation of the motor shaft results in rotation of the annulus of the second unit but not in rotation of the planet carrier thereof;
  the annulus gears being in the form of cylindrically shaped rings which also carry respective arrays of teeth facing each other in an axial direction, and the clutch means comprises thrust means for moving the ring forming the annulus of the second epicyclic unit towards and away from the other ring in an axial direction so as to move the said teeth into and out of engagement with each other; and a coupling connecting the planet carrier of the second epicyclic unit to cause translational movement of an actuator output member of the actuator.

6. An actuator according to claim 5, in which the said coupling comprises an output shaft connected to be rotated by the rotation of the planet carrier of the second epicyclic unit and mounted coaxially of the motor shaft, and the actuator output member comprises a cable mounted substantially normal to the axis of the output shaft, and drive means converting rotation of the output shaft into linear movement of the cable.

7. An actuator according to claim 6, in which the drive means is in the form of a spiral tape arranged concentrically of the output shaft with one end linked to the output shaft and the other end linked to the end of the cable.

8. An actuator according to claim 6, in which the drive means includes gearing for increasing the mechanical advantage between the output shaft and the linear movement of the cable.

9. An actuator according to claim 6, in which the drive means includes limiting means for limiting the total angular movement of the output shaft, the limiting means comprising a rotary member carried by the output shaft and rotatable adjacent to a fixed member, a spirally arranged groove in one of the said members and pin means engaging the groove and carried by the other of the members, whereby the said angular movement is limited by the length of the groove.

10. An actuator according to claim 5, in which the thrust means comprises an electrically energisable coil and an armature responsive to the electromagnetic force produced thereby.

11. An actuator, comprising a motor having a rotatable output shaft, an output member mounted for translational movement, first and second epicyclic gear units mounted coaxially of each other and of the output shaft and each being in the form of a plurality of planet gears supported on a planet carrier and engaging an annulus gear, the first epicyclic unit providing geared reduction of the rotation of the output shaft and connecting it to the second epicyclic unit which provides further geared reduction and is connected to the output member to cause corresponding translational movement thereof, and a clutch for interrupting the drive between the motor output shaft and the output member and comprising means for releasably braking the annulus of one said epicyclic gear unit, the annulus of the second epicyclic unit being held permanently stationary and the said annuli carrying respective arrays of teeth which face each other in the axial direction, the said clutch comprising means for releasably braking the annulus of the said first gear unit by moving the annulus in the axial direction so as to bring its teeth into and out of engagement with the teeth on the annulus of the said second gear unit.

12. An actuator according to claim 11, in which the clutch includes electromagnetic means for moving the annulus of the first gear unit axially.

* * * * *